May 21, 1957  J. E. WHITE  2,793,314
LONG-LIFE GAS-FILLED TUBES
Filed Jan. 30, 1952
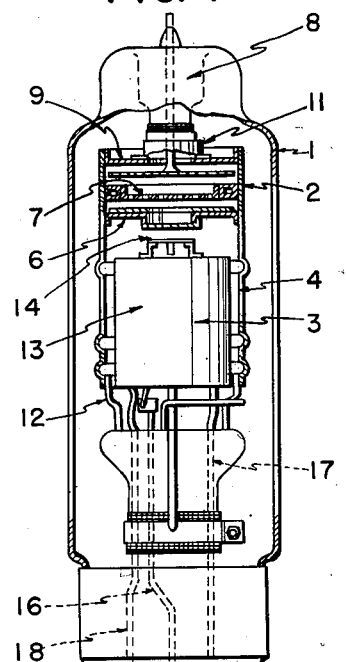
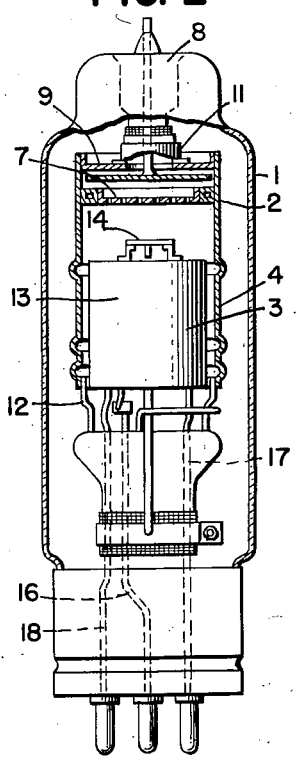
INVENTOR.
BY John E. White
Howard L. Rose
AGENT

# United States Patent Office 2,793,314
Patented May 21, 1957

2,793,314
LONG-LIFE GAS-FILLED TUBES

John E. White, Scotia, N. Y., assignor to the United States of America as represented by the Secretary of Commerce Application January 30, 1952, Serial No. 269,099

4 Claims. (Cl. 313—218)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to gas-filled tubes and more particularly to structural arrangements for preventing the phenomenon known as "clean-up."

Much work has been done in the prior art to prevent the gradual reduction in gas pressure in grid-controlled gas tubes due to the mechanism known as clean-up. In many tubes attempts have been made to keep the temperatures of the metallic working surfaces high enough so that they will re-emit the gas as it is absorbed. However, this entails the use of very high temperatures in the tube, and the difficulty often arises of attempting to out-gas surfaces which normally would not be heated to sufficiently high temperature. In prior art hydrogen thyratrons the practice has developed of including hydrides of various metals in the tubes and using the hydrides as reservoirs for hydrogen. In these devices it is necessary to keep the temperature within very narrow limits, since it is the temperature which controls the amount of hydrogen released from the hydride and therefore controls the pressure within the tube. This materially limits the temperature range in which the tube can be operated.

The primary object of the invention is to provide gas tubes that are comparatively free from the clean-up phenomenon.

Another object of the invention is to prevent high-energy gas molecules from reaching surfaces that are hard to out-gas.

It is another object of the invention to provide gas tubes that can operate over wide temperature and pressure ranges without experiencing clean-up.

It is another object of the invention to provide hydrogen-filled tubes in which some tube parts are coated with a hydride-forming metal.

Other uses and advantages of the invention will become apparent upon reference to the specification and drawings.

Figure 1 is an elevational view of the hydrogen-filled thyratron.

Figure 2 is an elevational view of a noble-gas tube.

As previously stated, electron tubes filled with gases tend to be short lived because of progressive pressure reduction that occurs during operation because the structural members take up quantities of the gas with which the tube is filled. This phenomenon is generally known as "clean-up." There seems to be several reasons for this gradual pressure reduction. One reason is that the high-speed gas ions become embedded in the material they strike. Another reason is that the high-speed ions striking an oppositely charged surface become neutralized and fly off from that surface with all, or a large portion, of their initial kinetic energy; that is, high-speed neutral atoms may travel, or generate others which may travel, out of the discharge region with retention of sufficient kinetic energy to clean-up on some surface finally reached.

It is well known that many substances will emit sorbed gases when heated to a sufficiently high temperature. However, it is not always possible to keep all surfaces in a tube heated to the proper temperature unless provisions are made for using materials which will emit the trapped gas at comparatively low temperatures.

In accordance with the present invention all surfaces in or close to the discharge region are coated with a material which will re-emit most of the trapped gas at temperatures well below the normal operating temperature of that part of the tube. Further, the discharge region is very tightly enclosed in an effort to prevent the high-speed neutral atoms from reaching surfaces which cannot conveniently or economically be coated or which cannot be sufficiently heated.

The gas-filled tubes which may be modified according to the present invention may take the form of diode "Phantrons," voltage regulator tubes, or single or multi-grid tubes. The single grid tube has been shown in the drawings for the purposes of demonstration, but the invention is in no way limited to this type.

Referring to Figure 1, 1 is the outer glass envelope of the gas-filled tube, 2 is the anode, 3 is the cathode assembly, and 6 and 7 are the grid assembly. The anode 2 emerges from the envelope through the upper glass seal 8, which also holds the anode in spaced relationship to the grid. The grid cylinder 4 forms the sides of a solid enclosure about the discharge space, which enclosure is completed by the disk 9 and the collar 11. The collar 11 is fastened to the glass seal and to the disk 9. The upper part of the grid cylinder 4 acts as a support for the grid 7 and baffle 6, and the lower portion of the cylinder 4 is connected to the grid lead-in wire 12.

Only the external radiation shield 13 and the baffle 14 of the cathode are shown in this figure. However, the cathode is of a conventional structure such as that shown in the Reilly et al. Patent No. 2,497,911, and forms no part of the present invention. The baffle 14 is provided in the discharge path to act as a heat shield as well as to prevent the deposition of the electron-emitting oxides from the cathode on the grid and anode elements. The external heat shield 13 of the cathode structure 3 is supported by lead-in wires 16 and 17, which are connected to external pins of the tube. The glass envelope 1 is cemented to the base 18 in the well-known manner. It will be noted that the conventional mesh structure of the grid has been eliminated and the cylinder 4 has been extended to disk 9 to form a solid enclosure about the discharge path. Also the external heat shield 13 of the cathode structure 3 has been made larger in diameter than that used in conventional tubes of this type. This provides a narrow gap between the shield 13 and the cylinder 4 which greatly reduces the opportunity for the high-speed neutral atoms and high-speed ions to leave the discharge region without being trapped in either cylinder 4 or shield 13, both of which will operate at a sufficiently high temperature to re-emit absorbed hydrogen. The tube should be designed so that the distance between the external heat shield 13 and the grid cylinder is not less than 1 millimeter. This distance, however, is variable and will depend upon the expected voltages and the length of the gap between these two surfaces. The comparatively tight enclosure about the discharge region provided by these two modifications of the prior art tubes has done much toward preventing ions and neutral atoms from reaching surfaces which are hard to out-gas such as the inside of the glass envelope 1 and the lead-in wires.

The major change from the prior art is in the use of palladium as a coating on all surfaces likely to be bombarded by high-speed ions and neutral atoms rather than using a concentrated quantity of a metal hydride as a hydrogen reservoir. As pointed out, hydrogen reservoirs were employed in the prior art, the temperature of these reservoirs being controlled within very narrow limits so as to keep the pressure within the desired range. There were several disadvantages to this, such as the need for very close temperature control and the fact that the hydrogen reservoir contained much more of the gas than required to fill the tube to its operating pressure. In the present invention palladium is used because of the very low temperature at which palladium hydride will give up all of its hydrogen. At atmospheric pressure palladium hydride will decompose at approximately 150 degrees C.; however, at the pressures employed in gas tubes, which are normally below 800 microns of mercury the same hydride will decompose at less than 50 degrees C. Since this temperature is so low, it should be immediately apparent that any surface in the tube that is coated with the palladium will run hot enough to re-emit any hydrogen that is held in, or that subsequently strikes, the surface. This hydride-forming metal coating should be thick enough to shield the hard-to-out-gas structural metal from gas penetration but should still be thin enough to avoid any possibility of holding so much gas in the coating that its release would disturb proper functioning of the tube. This coating will be from 10 to 100 atomic diameters thick depending upon the location of the part coated and the load for which the tube is designed. As an example of the effect of the hydride-forming metal coating, if the palladium coating on nickel structural members is of the proper thickness, the hydrogen pressure will be perhaps 5 to 50 microns below the normal operating pressure when the internal parts of the tube are at room temperature or below. As the temperature of the tube is raised, the pressure will rise to its normal operating value by the time the parts reach approximately 50 degrees C., after which the parts can go to any higher temperature without changing the hydrogen pressure.

This method allows the use over all structural members of a thin hydride-forming metal coating that will decompose at a low temperature so that the metal coating that remains will contain no hydrogen when these parts have once reached their operating temperatures. This, in addition to the greatly reduced possibility of ions or neutral atoms reaching the outer envelope 1 and other comparatively cool and uncoated surfaces, will materially reduce the clean-up phenomenon and therefore prolong the life of the tube.

Other metals besides palladium which can be used in the conventional gas tube, where the pressures do not exceed 800 microns of mercury, are vanadium and tantalum. Alkali metals form hydrides and could be used except where the low work functions of these materials would cause trouble, such as on the grids of the tube.

Referring to Figure 2, it will be noted that the only structural change made in the tube shown in Figure 1 is that the baffle 6 has been eliminated. This has been done because the evaporation from the cathode is lower in noble gases than in hydrogen and therefore makes it unnecessary. Outside of this, the structural arrangement of the tube to be used with noble gases is identical with that of the hydrogen-filled tube. The tight shielding about the discharge space provided by the cylinder 4 again prevents clean-up on surfaces that are hard to out-gas. By coating the metal surfaces within the discharge region with glass or certain ceramics which give off their gases at approximately 400 degrees C., the temperature needed for re-emission can be reduced from say 900 degrees C., which is the temperature at which nickel will re-emit the noble gases. In the alternative, re-emission of the noble gases may be facilitated by coating these surfaces with low melting point metals, since a metal at or near its melting point will not hold noble gases, which are insoluble in metals. Metals which will not sorb noble gases at the operating temperatures and pressures of gas tubes, the former being in excess of 50° C. and the latter being not more than 800 microns of mercury, are indium, tin, gallium, and silver.

In both the hydrogen tube and the tube filled with a noble gas the surfaces to be coated will depend upon the operating temperature of the tube. The exact operating temperatures of the different tube parts are not known, but in many tubes of this type the anodes and cathodes will operate hot enough for this purpose, and in some cases the inner cathode radiating shield may be hot enough. In most applications, however, it will be necessary to coat the grid components, if present, radiation and heat shields, baffles, disks and collars such as 9 and 11, and other parts which are located in contact with or near the arc plasma. It may be necessary in some special applications to provide special radiation shields so as to keep all surfaces operating at the proper temperature. In normal operation, however, this will not be necessary.

Another alternative presents itself, particularly when the tubes are being used for modulator service. When so used, high-speed ions may directly strike the inner radiation shield of the cathode. As these high-speed ions penetrate deeper than the reflected neutral atoms, the radiation shields may be presented from clean-up by electrically connecting them to the grid, thereby making them positive during the conduction period.

It will be apparent that the embodiments shown are only exemplary and that various modifications can be made in construction and arrangement within the scope of my invention as defined in the appended claims.

I claim:

1. A gas-filled tube having a discharge region, metallic tube elements substantially completely enclosing said discharge region, the gas in said tube being subject to clean up by said elements at the normal operating temperature and pressure of said tube, and coating means on said elements for preventing said clean up by being unable to retain any of said gas at said temperature and pressure, said coating means formed of a substance which gives off all of said gas at pressure of less than 800 microns of mercury in a temperature range between 50 degrees C. and the normal operating temperature of said elements.

2. A gas-filled tube as defined in claim 1 in which said gas is a noble gas and said coating means is indium.

3. A gas-filled tube as defined in claim 1 in which said gas is a noble gas and said coating means is tin.

4. A noble-gas-filled tube having a discharge region, metallic tube elements comprising a baffle, grid members, and heat and raidation shields substantially completely enclosing said discharge region, the gas in said tube being subject to clean up by said elements at the normal operating temperature and pressure of said tube, and indium coating means on said elements for preventing said clean up by being unable to retain any of said gas at said temperature and pressure, said indium forming a coating which gives off all of said gas at pressures of less than 800 microns of mercury in a temperature range between 50 degrees C. and the normal operating temperature of said elements.

References Cited in the file of this patent
UNITED STATES PATENTS

| | | |
|---|---|---|
| 1,656,956 | Schroter | Jan. 24, 1928 |
| 1,884,464 | Wilson | Oct. 25, 1932 |
| 2,423,426 | McCarthy | July 1, 1947 |
| 2,479,529 | Watrous et al. | Aug. 16, 1949 |
| 2,497,911 | Reilly et al. | Feb. 21, 1950 |
| 2,572,881 | Rothstein | Oct. 30, 1951 |

OTHER REFERENCES

Yarwood: "High Vacuum Technique," Chapman & Hall, London, 1945, page 117.

Dushman: "Vacuum Technique," 1949, John Wiley & Sons, Inc., N. Y., page 575.